United States Patent
Baldwin et al.

(10) Patent No.: US 10,664,593 B2
(45) Date of Patent: May 26, 2020

(54) CHECKING A SECURITY VALUE CALCULATED FOR A PART OF A PROGRAM CODE

(71) Applicant: Hewlett-Packard Development Company, L.P., Houston, TX (US)

(72) Inventors: Adrian Baldwin, Bristol (GB); Jonathan Griffin, Bristol (GB)

(73) Assignee: Hewlett-Packard Development Company, L.P., Spring, TX (US)

(*) Notice: Subject to any disclaimer, the term of this patent is extended or adjusted under 35 U.S.C. 154(b) by 58 days.

(21) Appl. No.: 15/764,170

(22) PCT Filed: Oct. 29, 2015

(86) PCT No.: PCT/EP2015/075165
§ 371 (c)(1),
(2) Date: Mar. 28, 2018

(87) PCT Pub. No.: WO2017/071763
PCT Pub. Date: May 4, 2017

(65) Prior Publication Data
US 2018/0276374 A1     Sep. 27, 2018

(51) Int. Cl.
*G06F 21/54*     (2013.01)
*G06F 21/12*     (2013.01)
(Continued)

(52) U.S. Cl.
CPC .............. *G06F 21/54* (2013.01); *G06F 21/12* (2013.01); *G06F 21/50* (2013.01); *G06F 21/51* (2013.01);
(Continued)

(58) Field of Classification Search
CPC .. G06F 21/54; G06F 21/50–54; G06F 21/565; G06F 21/64
See application file for complete search history.

(56) References Cited

U.S. PATENT DOCUMENTS 6,925,566 B1 * 8/2005 Feigen ................. H04L 63/102
        348/E7.069
6,934,887 B1 * 8/2005 Baldischweiler ....... G06F 11/28
        714/38.13

(Continued)

OTHER PUBLICATIONS

Hoi Chang and Mikhail J. Atallah. Protecting Software Code by Guards. In Revised Papers from the ACM CCS-8 Workshop on Security and Privacy in Digital Rights, May 7, 2002.
(Continued)

*Primary Examiner* — Thaddeus J Plecha
(74) *Attorney, Agent, or Firm* — Middleton Reutlinger

(57) ABSTRACT

An apparatus includes a first processing resource to execute a program code, and a second processing resource separate from the first processing resource. The program code includes an embedded execution unit. The execution unit, during execution of the program code, calculates a first security value for a part of the program code. The second processing resource runs a validation program. The validation program receives the first security value, checks the first security value against a second security value calculated from a corresponding part of a reference copy of the program code to obtain a check result, returns the check result to the execution unit. The execution unit performs a security-related action in response to a check result indicating a mismatch between the first security value and the second security value.

14 Claims, 6 Drawing Sheets

(51) Int. Cl.
*G06F 21/50* (2013.01)
*G06F 21/52* (2013.01)
*G06F 21/53* (2013.01)
*G06F 21/56* (2013.01)
*G06F 21/51* (2013.01)
*G06F 21/64* (2013.01)
*H04L 9/08* (2006.01)

(52) U.S. Cl.
CPC .............. *G06F 21/52* (2013.01); *G06F 21/53* (2013.01); *G06F 21/565* (2013.01); *G06F 21/64* (2013.01); *H04L 9/0869* (2013.01)

(56) References Cited

U.S. PATENT DOCUMENTS

| | | | |
|---|---|---|---|
| 7,765,374 B2 | 7/2010 | Field et al. | |
| 7,882,318 B2 | 2/2011 | Savagaonkar et al. | |
| 8,380,987 B2 | 2/2013 | Traut et al. | |
| 8,443,440 B2 | 5/2013 | McGee | |
| 9,690,598 B2* | 6/2017 | Lindteigen | H04L 63/123 |
| 10,009,184 B1* | 6/2018 | Baldwin | H04L 9/0891 |
| 2005/0066165 A1* | 3/2005 | Peled | G06F 21/316 |
| | | | 713/165 |
| 2005/0188214 A1* | 8/2005 | Worley | G06F 21/52 |
| | | | 713/187 |
| 2006/0047955 A1 | 3/2006 | Prevost | |
| 2006/0190988 A1* | 8/2006 | Adams | G06F 21/6236 |
| | | | 726/2 |
| 2007/0005992 A1* | 1/2007 | Schluessler | G06F 21/54 |
| | | | 713/193 |
| 2007/0283140 A1 | 12/2007 | Jones et al. | |
| 2007/0300292 A1* | 12/2007 | Scipioni | G06F 21/31 |
| | | | 726/5 |
| 2008/0134321 A1 | 6/2008 | Rajagopal et al. | |
| 2009/0193211 A1 | 7/2009 | Hu | |
| 2010/0107246 A1* | 4/2010 | Ohta | G06F 21/52 |
| | | | 726/22 |
| 2012/0159630 A1* | 6/2012 | Wang | G06F 21/51 |
| | | | 726/24 |
| 2014/0189340 A1 | 7/2014 | Hadley | |
| 2014/0282906 A1* | 9/2014 | Ignatchenko | H04L 9/3234 |
| | | | 726/4 |
| 2017/0078199 A1* | 3/2017 | Mosko | H04L 45/7453 |
| 2017/0353604 A1* | 12/2017 | Martine | H04M 3/42068 |
| 2018/0114000 A1* | 4/2018 | Taylor | G06F 21/12 |

OTHER PUBLICATIONS

OMTP, "Advanced Trusted Environment: OMTP TR1"; May 28, 2009; Available at: http://www.gsma.com/newsroom/wp-content/uploads/2012/03/omtpadvancedtrustedenvironmentomtptr1v11.pdf.

* cited by examiner

CHECKING A SECURITY VALUE CALCULATED FOR A PART OF A PROGRAM CODE

BACKGROUND

A program code causes a computer system to run an application or agent when being executed by a processor of the computing system. The program code may be subject to illegitimate modifications.

DETAILED DESCRIPTION

Figure 1:
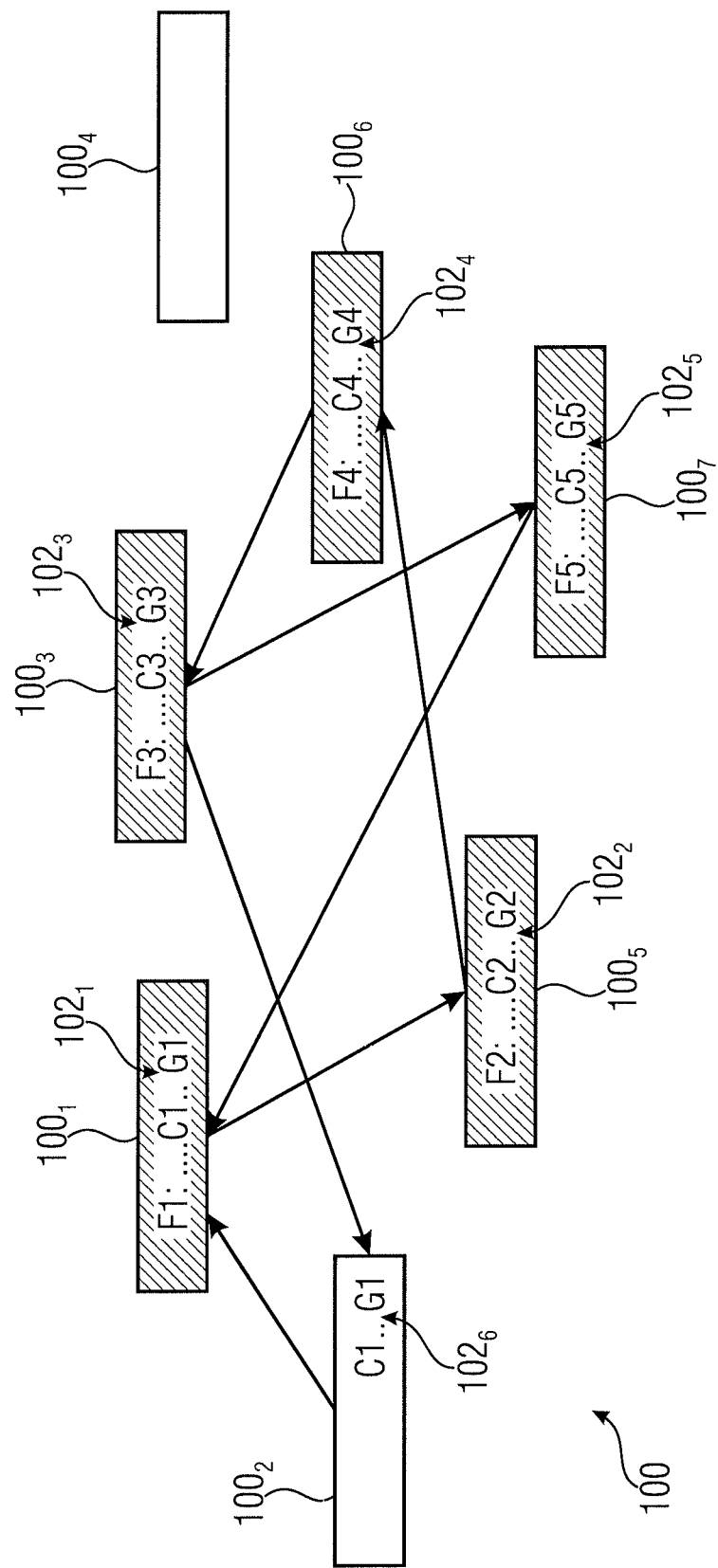
FIG. 1 is a schematic illustration of an example guard network.

The following detailed description refers to the accompanying drawings. Wherever possible, the same reference numbers are used in the drawings and the following description to refer to the same or similar parts. While several examples are described in the following, modifications, adaptations, and other implementations are possible. Accordingly, the following detailed description does not limit the disclosed examples. Instead, the proper scope of the disclosed examples may be defined by the appended claims.

Mechanisms for protecting program codes may be embedded into the program code or may be part of the program code. Tamperproof techniques aim at making it hard to subvert a piece of the program code as it runs. This may be used for copyright protection to ensure that license checks cannot be removed from a program code. An example of such a mechanism for protecting a program code involves adding or embedding into the program code a code block for monitoring a desired part of the program code and to take some action in case tampering of the monitored part of the program code. The program block may also be referred to as execution unit or guard. The program code may include a plurality of functions, which are to be monitored, and some guards may be provided in the program code to perform a check on the functions. Such a mechanism may also be referred to as a guard network.

FIG. 1 is a schematic illustration of an example guard network. FIG. 1 shows a schematic representation of a program code 100 having a plurality of code blocks $100_1$ to $100_7$. The program code 100 includes five security-sensitive regions represented by the code blocks $100_1, 100_3$ and $100_5$ to $100_7$. The security-sensitive regions perform the functions F1 to F5, which are monitored so as to ensure for a correct working of the program code when being run on a computing system. To monitor the security-sensitive regions of the program code a plurality of guards $102_1$ to $102_6$ are added to the program code. A first guard $102_1$ has been added to the code block $100_1$ implementing a first function F1. Likewise, guards $102_2$ to $102_5$ are added to the code blocks implementing the functions F2 to F5. Code block $100_2$, which does not implement a security-sensitive function, includes include another guard $102_6$. The guards $102_1$ to $102_6$ include a first part C1 to C6, which is provided to run a check on the memory for the functions F1 to F5 that it is being pointed to. The check may be the calculation of a first security value, e.g., a checksum or a crypto hash. The check may include retrieving the address of the function in a memory in which the code blocks are stored and to calculate the checksum or crypto hash over the memory portion containing the part of the program code to be monitored.

The guards $102_1$ to $102_6$ include a second part G1 to G6 which receives the results of the check, e.g. the calculated checksum, and determines whether the result is correct or not. For example, the first security value may be comparing it to a precomputed value, also referred to as a second security value. The second security value may be a precomputed checksum to which the calculated checksum is compared. In case of a match of the first and second security values program execution is continued normally, and in case of a mismatch between the first and second security values the guard may trigger security-related actions. A mismatch between the first and second security values may also be referred to as a detection event, and the security-related action be the logging the detection events for later evaluation. In other instances, the program code may be made unusable, for example by halting its execution or causing an eventual crash that may be hard to trace back to the guard. Another example of a security-related action may be a restoration of the piece of damaged or tampered code, which caused the mismatch, before executing it. The restoration may include overwriting a tampered part of the program code with a clean copy of the part of the program code.

In the example shown in FIG. 1 the security-sensitive functions F1 to F5 are shown. In accordance with other examples more or less security-relevant functions may be included in the program code. In addition, program code blocks $102_2$ and $102_4$ are shown which do not include any security-relevant sections that are to be monitored. In other examples there may be more or less non-security-relevant code blocks in the program code. In the example of FIG. 1, the guards $102_1$ to $102_5$ are shown to be in the same code block as the functions F1 to F5. In accordance with other examples the guards $102_1$ to $102_5$ may be provided in parts of the program code which are separate or distant from the parts where the functions are placed, see e.g. code block $100_2$ including the guard $102_6$ for monitoring function F1 remote from the part of program the code where the function F1 is included.

In the example of FIG. 1, guard $102_1$ runs a checksum calculation on the part of the memory holding the function F2 and receives the result of the checksum calculation, which is then evaluated or checked by the guard $102_1$ to see whether it matches a precomputed checksum. In a similar way guard $102_2$ monitors function F4, guard $102_3$ monitors function F5, guard $102_4$ monitors function F3, and guard $102_5$ monitors function F1. In accordance with examples the guards may also monitor other guards. The guard $102_3$ monitors guard $102_6$ and calculates a checksum using the memory part in which the guard $102_6$ is held so as to determine, using the returned checksum, whether the guard $102_6$ has been tampered or not. Guard $102_6$, in the depicted example, is used to monitor function F1.

The guards depicted in the example guard network of FIG. 1 may cause different security-related actions in case of a mismatch of the first and second security values. For example, some guards may log suspicious events indicated by the mismatch, cause a repair of the monitored memory portion using reference data, or cause a halt of the execution of the function or the entire program code. The guards may also use combinations of the just-mentioned actions.

Figure 2:
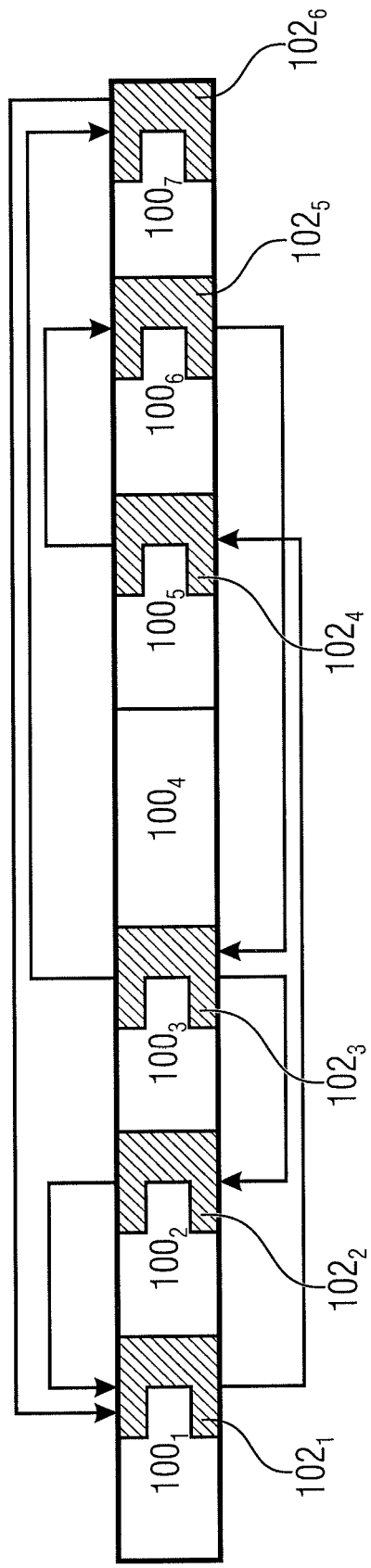
FIG. 2 shows an example memory layout of the guarded program code 100 of FIG. 1.

The program code 100 shown in FIG. 1 may be stored in a memory of a computing system, and FIG. 2 shows an example memory layout of the guarded program code 100. The code blocks $100_1$ to $100_7$ are arranged subsequently in the memory layout and the guards are schematically represented by the hashed sections of the code blocks. The arrows represent the checks performed by the guards on the other memory parts.

In accordance with examples, the program code shown in FIG. 1 and FIG. 2 may be an agent application downloaded onto a client computer system, for example a laptop, to help manage the computer system, for example for performing security management and monitoring tasks. Such an application is likely to be targeted by malware infecting the computing system in order to avoid detection and removal. The above-described guard network or guarded program code provides a security feature that allows to check and report on the correct working of the agent or program code running on the client computer system, and it allows for verifying the correct execution of a long running process by providing the possibility to carry out runtime checks as the agent or a program code is executed.

Figure 3:
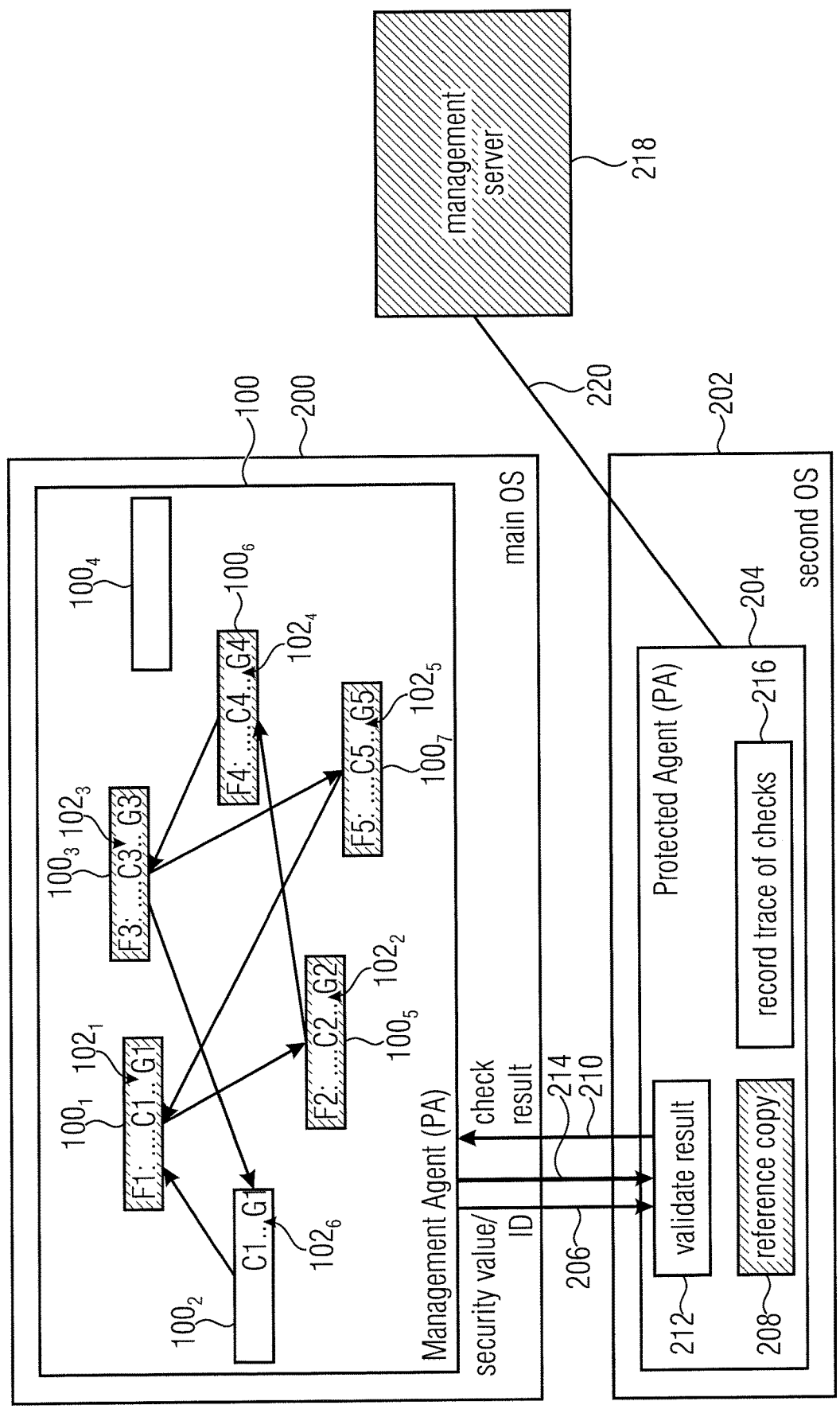
FIG. 3 shows an example apparatus to execute a guarded program code.

FIG. 3 is a schematic representation of an example apparatus to execute, in a first processing resource 200, the program code 100 including the plurality of guards $102_1$ to $102_6$. When executing the program code 100 in the first processing resource 200 a guard, also referred to as execution unit, calculates a first security value for a part of the program code 100. The first security value may be calculated using different types of calculations. A variety of functions may be used with varying complexity from simple checksum calculations or additions through to cryptographic hash calculations. The apparatus comprises a second processing resource 202 separate from the first processing resource 100. The second processing resource 202 runs a validation program 204. The validation program 204 receives the first security value, as is schematically depicted by arrow 206. The validation program 204 checks the first security value against a second security value that is calculated from a corresponding part of a reference copy 208 of the program code 100 to obtain a check result which is returned to the guard, as is schematically represented by arrow 210. The first and second processing resources may be provided with a fast inter-domain communication mechanism, for example using a shared memory, for communicating information, like the first security value and the check result. In accordance with other examples additional information may be communicated. The guard receiving the check result 210 performs a security-related action in response to a check result 210 indicating a mismatch between the first security value and the second security value. In accordance with examples, the security-related action includes logging the mismatch event, halting execution of the program code or of a part of the program code and/or repairing part of the program code using, for example, the reference copy 208.

In accordance with examples, the second security value may be calculated remote from the validation program 204, for example by an external unit of a computing system generating second security values for code blocks of the program code using the reference copy of the program code 100. The pre-calculated security values, for example checksums, may be stored in the second processing environment 202 together with the validation program 204. To validate the first security value 206 a corresponding second security value may be accessed and compared to the first security value 206 provide the check result 210.

In accordance with other examples, the second processing resource 202 may store the reference copy 208 of the program code 100, and the validation program 204 may include a validation routine 212, which receives the first security value 206 and calculates the second security value using the reference copy 208 of the program code 100 stored at the second processing resource 202. The guards provided in the program code 100 may perform different checks or security calculations for different parts of the program code to be monitored, for example some of the guards may perform a checksum calculation, and others may perform a crypto hash value calculation. In other words, the guards $102_1$ to $102_6$ may perform the same or different types of calculations for obtaining the first security value. In examples allowing for the use of different types of calculations to be performed by the guards $102_1$ to $102_6$, when forwarding the first security value 206 to the validation program 204, also a type identifier 214 is forwarded to the validation program 204. The validation routine 212 of the validation program 204 determines, using the received type identifier 214, which type of calculation has been used by the guard in the program code 100 to calculate the first security value 206, and uses the identified type of calculation and the reference copy of the program code to calculate the second security value. In other words, it is determined what kind of check or what type of calculation has been applied to a part of the program code 100 and the same check or type of calculation is applied to the corresponding part of the reference copy 208 held in the second processing resource.

The first processing resource may be a main or first operating system, and the second processing resource may be a second operating system that are run on a single client system including a processor and memory, wherein the physical resources for the main and second operating systems 200, 202, for example the memory, are kept separate by the processor. The program code 100 may implement a management agent MA running in the main operating system 200, and the validation program 200 may implement a protected agent PA running in the second operating system 202. The management agent may be an application program downloaded onto the client computer system, for example a laptop computer, a desktop computer, a PDA or a smartphone. The management agent MA may help managing the client computer system or applications executed by the client computer system, for example for performing security management, configuration actions, security actions and monitoring tasks. The example apparatus of FIG. 3 allows detecting tampering or corruption of the management agent MA using the tamperproof program code 100. The first processing resource and the second processing resource may be co-located on the same physical system, e.g. a single computer including a processor on which the first processing resource and the second processing are executed. The computer may include more than one processor. In accordance with examples the first processing resource and the second processing resource may work off-line.

The technique described herein takes advantage of the separate processing environments for securely running the management agent MA free from interference of malware. In accordance with examples, the main operating system 200 and the second operating system 202 may be implemented on a single client system using virtualization technologies using, e.g., a secure hypervisor, which implements a multiple processing resource environment for running the program code 100 and the validation program 204 separate from each other in the separate operating systems. In accordance with examples other mechanisms for running secure processes may be employed, such as a checking process run within an area protected by TrustZone. In other words, examples of the technique described herein use an alternative processing resource, for example the second operating system 202, to verify the correct execution of an agent program which is implemented by a tamperproof program code including an embedded network of guards within a piece of the program code to check that selected functions have not been changed. The second processing resource is used to perform the validation or verification of the result of the check performed separate from the actual program code so that the result of the check is no longer hidden in the program code 100, which makes it hard to subvert the management agents program code 100. In accordance with examples, additional functionality may be added to the checks, e.g. randomness, as is described below.

In accordance with examples, the validation program 204 may retain a log of a plurality of check results obtained during execution of the program code 100, e.g. the management agent MA. The results may be stored to provide record traces of checks performed by the guarded program code, as is indicated by block 216 in FIG. 3. A trace of the execution of the management agent may be a count of checks performed successfully or unsuccessfully or may include frequency information indicating how often a specific function was checked and the results of the check.

In the examples described above the validation program 200 does not access first processing resource, also referred to as first processing domain. For example, the validation program 200 does not access the memory of the main operating system 200. The validation is performed in the second operating system 202, also referred to as second processing domain, and, therefore, has no knowledge about the operation of the main operating system or the organization of the memory used by the main operating system. In accordance with other examples the second processing resource 202 may see into and change the memory contents within the main operating system 200.

In accordance with examples, a system is provided including the apparatus and, as is shown in FIG. 3, a management server 218. The management server 218 is connected via a secure channel 220 to the validation program 204. The secure channel 220 may be established over the internet. The management server 218 may communicate with both the management agent MA and the protected agent PA to receive data from or to issue commands to the management agent MA and the protected agent PA. For example, the results of runtime checks, which may be recorded and stored by the validation program 204, are communicated to the management server 218 to allow detecting potential problems with the management agent MA from a remote position. For example, a system administrator may monitor a plurality of management agents running on different machines using the management agent MA, and examples of the technique described herein give confidence that the management agent is running correctly. The check information obtained by the validation program may be communicated to the management server 218 using a heartbeat protocol. The management server 218 may receive information about the check result or a log of a plurality of check results for performing an analysis. In accordance with an example, the management system 218 my send message to the validation program in response to the received resource information about the check result or in response to the analysis of the log of the plurality of check results, like a message causing the validation program to change the amount of ignore check signals send to the execution unit, or causing the validation program to change the program code to modify the execution unit as is described below.

Figure 4:
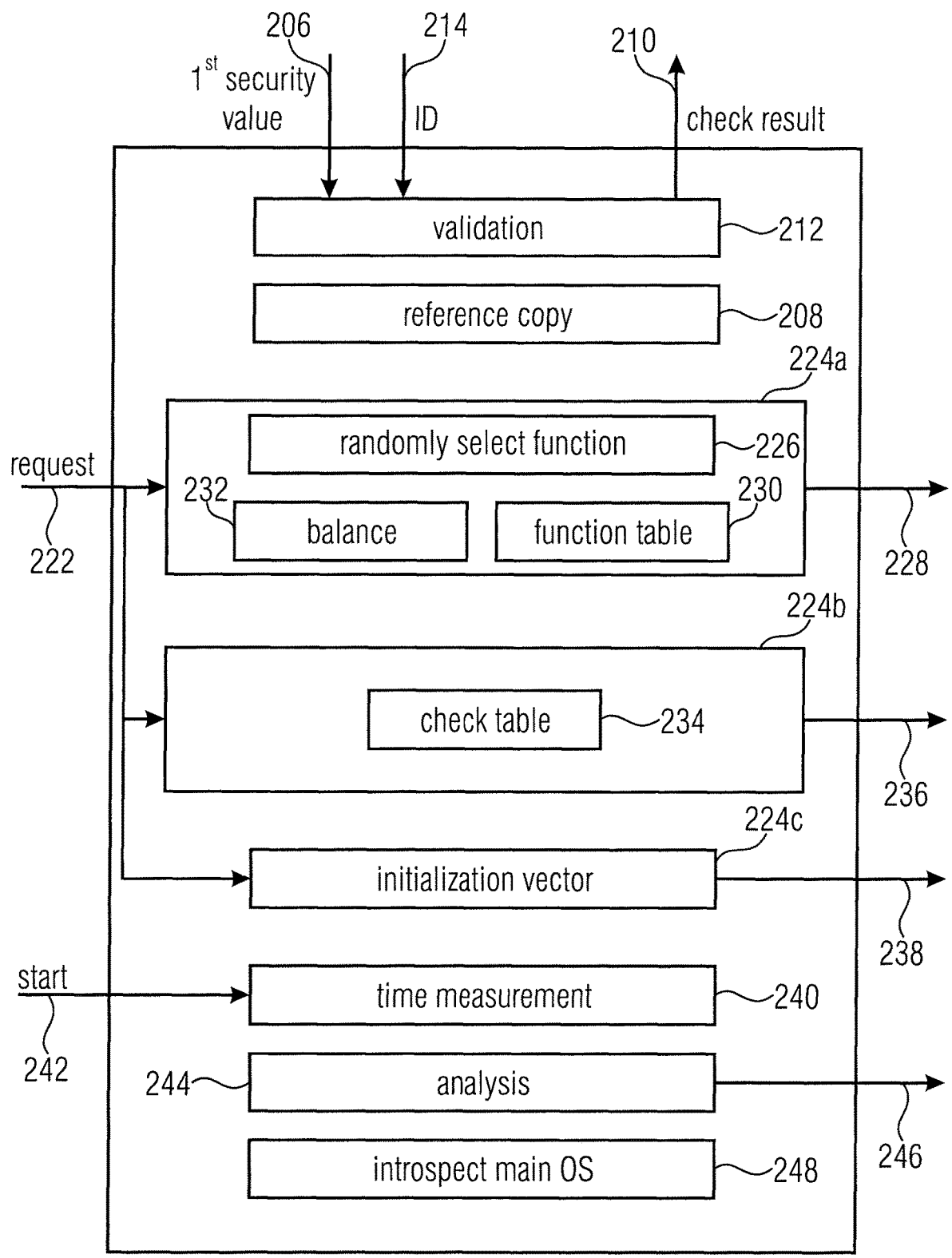
FIG. 4 is a schematic representation of an example validation program including additional functionality.

FIG. 4 is a schematic representation of an example validation program 204 including additional functionality that may be implemented, for example in the apparatus of FIG. 3. Adding the subsequently described functionality to the validation program 204 may make the overall system more robust against tampering. FIG. 4 shows schematically the outline of the validation program 204 including the validation routine 212 and the reference copy 208. The validation program 204 may include additional routines, e.g. for adding randomness to the calculation/check to be performed on the parts of the program code 100.

For example, prior to performing a check the management agent MA issues a request 222 to the validation program 204. In response to the request 222, the validation program 204 may call some of the subsequently described routines of the validation program 204. In response to the request 222, the validation program 204 may call routine 224a to randomly select the function in the management agent MA to be monitored, as is indicated by block 226. The routine 224a outputs to the management agent MA an indication 228 which of the functions F1 to F5 or which of the guards $102_1$ to $102_6$ is to be evaluated by calculating the first security value. The routine 224a may include a table 230 holding the functions/guards to be monitored. The table 230 may be created and randomized at an initialization stage. The function/guard to be monitored may be selected by accessing the table 230, for example, by going through the table using the table index. The randomization may be achieved by creating the table at the initialization stage with a random distribution of the functions/guards in the table. This example may be used to ensure that security calculations or checks cover the entire program code 100 even when the some of the functions F1 to F5 are called a majority of the time, while others are not called that often. To cover the entire program code 100, the validation program 204 may include a balance function 232 which selects the functions/guards in accordance with a preset pattern so as to ensure that all functions are evaluated/checked independent of how often a function is actually called by the program code 100. The pattern may cause that each of the functions/guard is evaluated/checked with the same frequency. In accordance with other examples, functions/guards determined to be more security-sensitive than others may be checked more often when compared to functions/guards being considered less security-relevant.

In accordance with another example, in response to the request 222, the validation program 204 may call a subroutine 224b which references a check table 234. The check table 234 indicates which kind of checks or calculations are to be carried out by the guards provided in the management agent. The check or the type of calculation 236 to be used for calculating the first security value is output to the management agent. The subroutine 224b may randomly select from the check routine table the check or the type of calculation 236 to be applied. The subroutine 224b may customize each of the check routines selected and may forward the check routine to be performed by the guards of the program code 100.

In accordance with other examples, the checks or calculations performed by the guards may use an initialization vector. For adding randomness the validation program 204 may include a subroutine 224c which, in response to the receipt of the request 222, causes the generation of a random initialization vector 238, which is returned to the management agent. The random initialization vector 238 may be used for randomly initializing a the check routine calculating the first security values so that the first security value cannot be predicted. For example, if the check is a hash then the initialization vector would cause hash(iv::code) to be computed rather than just the hash(code), where :: is a concatenate operation. The result cannot be predicted. But both parts of the check know the answer.

The routines 224a to 224c adding randomness to the check routines to be performed make it harder to prepare answers to checks or check routines that compare correctly with the reference copy and associated checks that the validation program performs.

In accordance with another example, the validation program 204 may include routine 240 which uses time information about the performance of the checks performed. A guard which is about to start the calculation of the first security value may send an indication 242 of the start. The indication 242 is received by the routine 240 which measures the time between receipt of the indication 224 and receipt of the first security value 206 at the validation program 204. In case the response from the management agent, namely the receipt of the first security value, is slow in relation to the check routine applied to the program code part, this may be marked to be suspicious event. For example, dependent on the type of calculation used to calculate the first security value, e.g. the complexity of the calculation, a threshold may be set, and in case the time measured by routine 240 exceeds the threshold, it may be determined that there is a suspicious event and that the program code is to be monitored more closely.

In accordance with other examples, the validation program 204 may include a routine 244 to analyze the performance of the management agent MA. For example, a statistical analysis or heuristics may be used to evaluate the check results 210. The threat environment may be set in response to a message from the management server 218 or may be determined through the analysis of the checks performed. If a low threat environment is indicated, in response to the request 222 the routine 244 may return an ignore check signal 246 for some of the checks. The ignore check signal 246 may prevent the execution unit from performing the check, e.g. calculating the first security value. If a change to a high threat environment is indicated, the amount of ignore messages 246 may be reduced. For example, in case the number of suspicious events rises, for example due to the fact that the number of mismatches between the first and second security values has risen above a predefined threshold or in case the time measurement in routine 240 indicated suspicious events, the number of ignore messages 246 may be reduced. This allows dynamically dealing with performance versus risk tradeoffs.

In accordance with other examples, instead of building all checks into the program code, detours-style hooks may be added to the functions in the program code as a part of the checking function to add a dynamic nature to the checks, which is a technique malware uses to hook into code, but in accordance with examples is used to dynamically hook in additional checks. For example, the validation program may access a memory associated with the first processing resource, and change the program code to modify the execution unit, or to replace the execution unit by a new execution unit, or to add to the program code a new execution unit.

In accordance with examples in which the second processing resource 202 may see into and change the memory contents within the main operating system 200, the validation program 204 may call routine 248 to introspect the memory of the main operating system 200. This may be used to perform randomization by placing different check addresses, initialization vectors and check code directly into the management agent.

In accordance with examples, some or all of the above described routines 224a to 224c, 240, 244, 248 may be implemented by the validation program 204.

In accordance with examples, the technique described herein also supports plugin extensions to the management agent MA. For example, in case of using tables indicative of the functions to be monitored in the program code 100, like in subroutine 224a in FIG. 4, in case of installing a plugin into the management agent MA, the table 230 may be updated or extended to include the additional functions to be monitored in the plugin. In addition, when adding a plugin a certified, for example, signed copy of the plugin may also be given to the validation program 204 as a reference copy so as to allow for the verification of the generated security values. Installing the plugin which is combined with checking functionality, allows the plugins to also be covered within the checking network or guard network.

Figure 5:
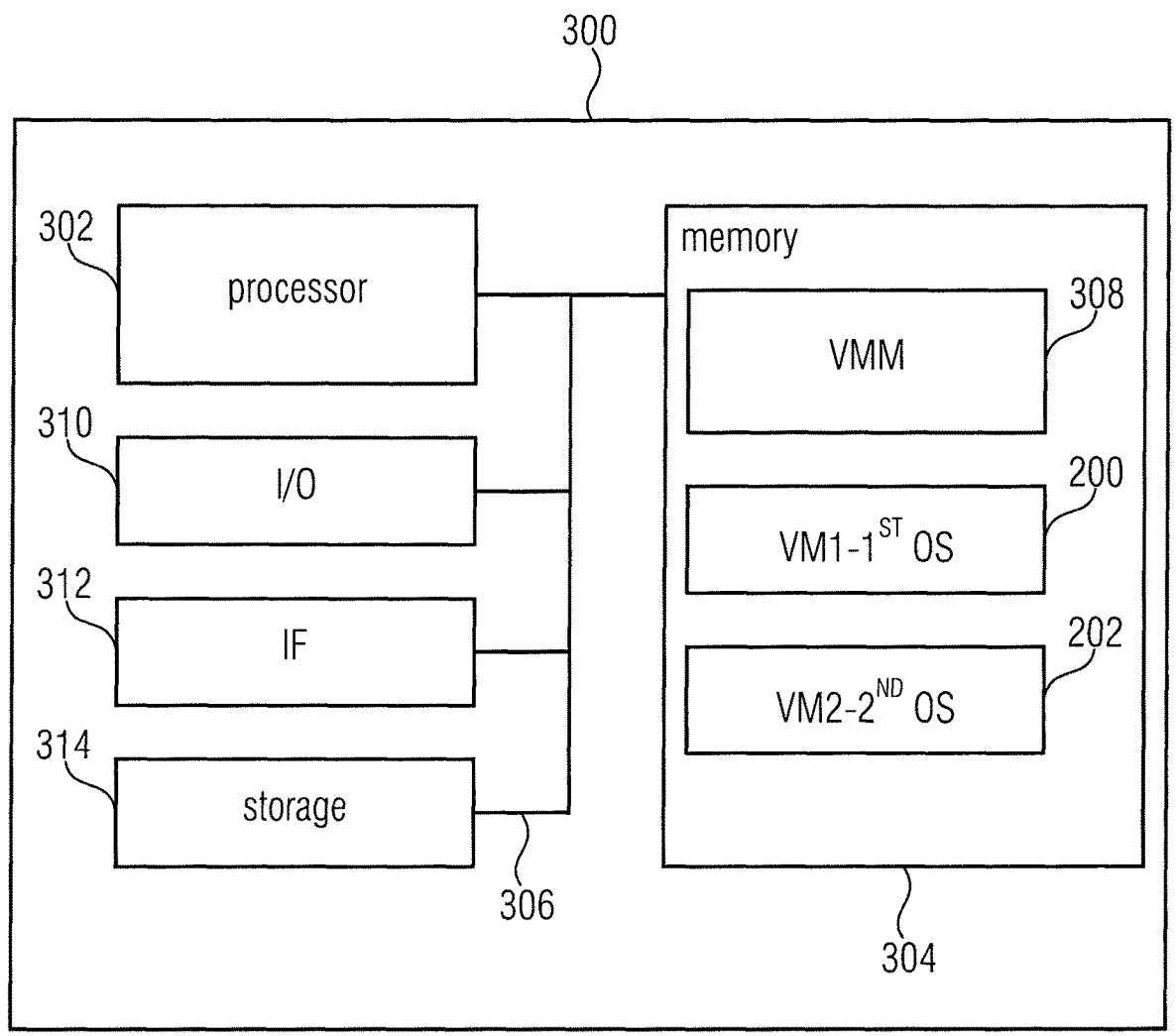
FIG. 5 illustrates an example computing system for implementing the technique described herein.

FIG. 5 illustrates an example computing system for implementing the technique described herein. The computing device 300 includes a processor 302 and a memory 304. A bus 306 may be provided for interconnecting the elements of the computing device 300. In accordance with examples, the memory 204 includes a virtual machine monitor 308, like a hypervisor, defining virtual machines VM1 and VM2 on which the first and second processing resources 200, 202, e.g. the main and second operating systems, are installed. The computing device 300 may also include input/output devices 310, for example a keyboard, a cursor control, etc., a communication interface 312, for example a network interface card, a modem, etc., and a storage device 314, for example a hard drive or a compact disc reader.

Figure 6:
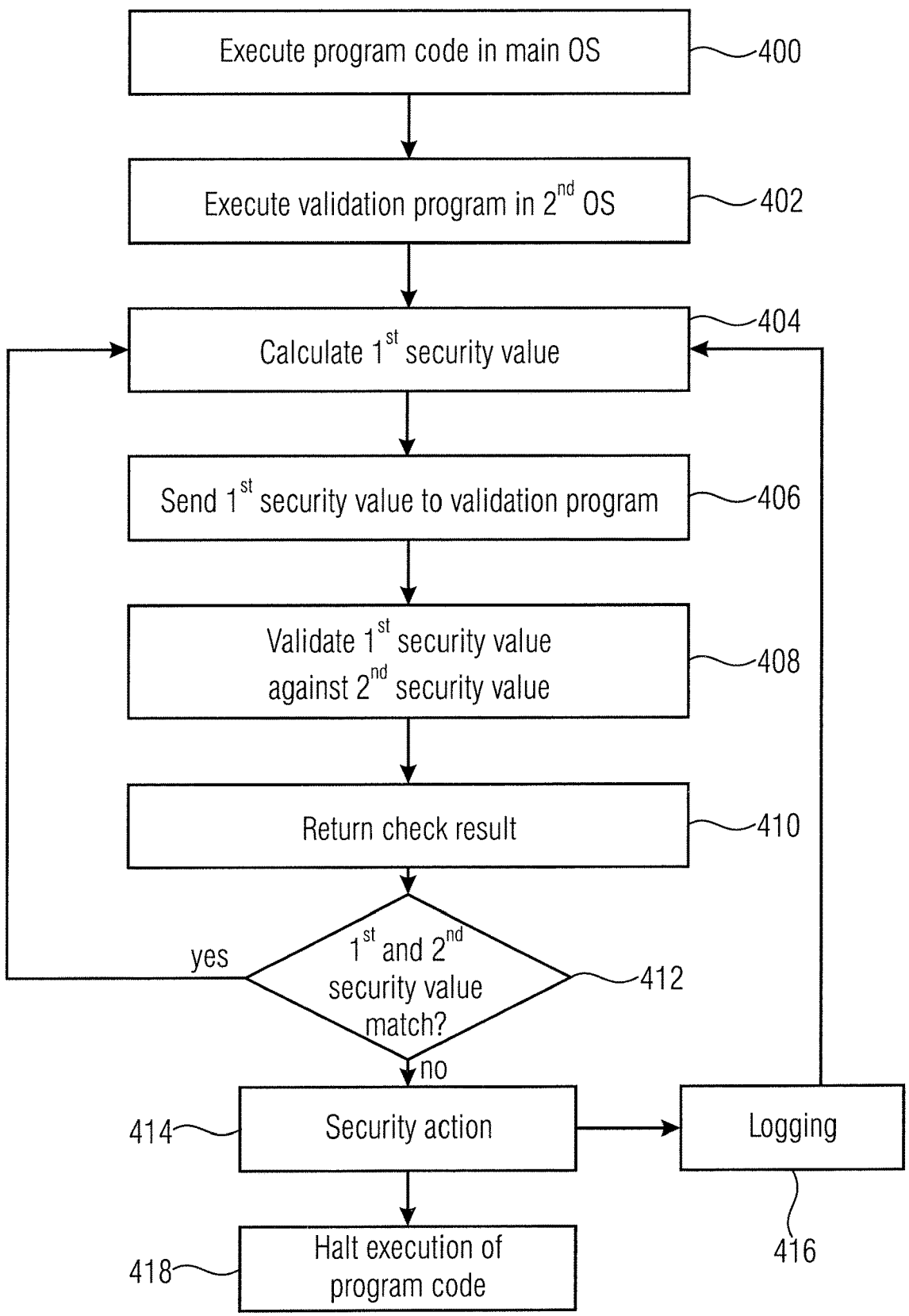
FIG. 6 is a flow diagram of an example method for verifying the correct execution of a program code.

FIG. 6 is a flow diagram of an example method for verifying the correct execution of a program code. At 400, the program code 100 including the embedded execution units $102_1$ to $102_6$ is executed by a first processing resource 200, for example by a first or main operating system installed on a virtual machine, like VM1 in FIG. 5. At 402, the validation program 204 is run, for example by the second operating system 202 installed on a second virtual machine, like VM2 in FIG. 5. During execution of the program code 100, at 404, a first security value for a part of the program code 100 is calculated, for example by one of the guards or execution units $102_1$ to $102_6$. The validation program 204 receives the first security value at 406 and, at 408, checks the first security value against the second security value calculated from a corresponding part of a reference copy of the program code to obtain a check result. At 410, the check result is returned to the guard or execution unit that performed the calculation of the first security value and, in case it is determined at 412 that there is no match between the first and second security values, the execution unit or guard performs a security-related action at 414. In accordance with examples, the security-related action at 414 may cause a logging of the result as indicated at 416 and the process then may return to 404 where a calculation for checking another part of a program is performed. In accordance with other examples, the security-related action at 414 may cause a halt of the program as indicated at 418. In case it is determined at 412 that the first and second security values match, the method returns to 404 and a new calculation or security value, for example for another part of the program code is carried out, thereby monitoring the integrity of the program code 100 during execution thereof.

Although some aspects of the techniques described herein have been described in the context of an apparatus, these aspects may also represent a description of the corresponding method, where a block or device corresponds to a method block or a feature of a method block. Analogously, aspects described in the context of a method also represent a description of a corresponding block or item or feature of a corresponding apparatus.

Examples described herein may be realized in the form of hardware, machine readable instructions or a combination of hardware and machine readable instructions. Any such machine readable instructions may be stored in the form of volatile or non-volatile storage, for example, a storage device such as a ROM, whether erasable or rewritable or not, or in the form of a volatile memory, for example, RAM, memory chips device or integrated circuits or an optically or magnetically readable medium, for example, a CD, DVD, magnetic disc or magnetic tape. The storage devices and storage media are examples of machine readable storage that is suitable for storing a program or programs that, when executed, implement examples described herein.

All of the features disclosed in this specification, including any accompanying claims, abstract and drawings, and/or all of the method or process so disclosed may be combined in any combination, except combinations where at least some of the features are mutually exclusive. Each feature disclosed in this specification, including any accompanying claims, abstract and drawings, may be replaced by alternative features serving the same, equivalent or similar purpose, unless expressly stated otherwise. Thus, unless expressly stated otherwise, each feature disclosed is one example of a generic series of equivalent or similar features.

The invention claimed is:

1. An apparatus, comprising:
  a first processing resource to execute a program code, the program code including a monitoring block, the monitoring block, during execution of the program code, to:
    issue a check request to a validation program,
    on receipt of an ignore check signal provided by the validation program as a response to the check request, decline to calculate a first security value for a part of the program code, and
    otherwise, calculate the first security value; and
  a second processing resource separate from the first processing resource, the second processing resource to run the validation program, the validation program to:
    send an ignore check signal to the monitoring block in response to the check request, or
    receive the first security value, check the first security value against a second security value calculated from a corresponding part of a reference copy of the program code to obtain a check result, and return the check result to the monitoring block,
  wherein the monitoring block is to perform a security-related action in response to a check result indicating a mismatch between the first security value and the second security value; and
    wherein an amount of ignore check signals sent to the monitoring block is determined dependent on a threat environment.

2. The apparatus of claim 1, wherein
  the second processing resource is to store the reference copy of the program code; and
  the validation program is to calculate the second security value using the reference copy of the program code stored at the second processing resource.

3. The apparatus of claim 2, wherein
  the validation program is to receive a type identifier, wherein the type identifier identifies a type of calculation used to calculate the first security value, and wherein the validation program is to calculate the second security value using the identified type of calculation and the reference copy of the program code.

4. The apparatus of claim 1, wherein
  the validation program is to retain a log of a plurality of check results obtained during execution of the program code.

5. The apparatus of claim 1, wherein
  the monitoring block is to issue a check request to the validation program; and
  the validation program is to indicate to the monitoring block a type of calculation to be performed on the part of the program code to calculate the first security value, wherein the validation program is to randomly select the type of calculation from a plurality of types of calculation.

6. The apparatus of claim 1, wherein
  the monitoring block is to calculate the first security value using a type of calculation using an initialization vector;
  the monitoring block is to issue a check request to the validation program; and
  the validation program is to provide a random initialization vector to the monitoring block.

7. The apparatus of claim 1, wherein
  the monitoring block is to issue a check request to the validation program; and
  the validation program is to randomly select from the program code the part for which the first security value is calculated by the monitoring block.

8. The apparatus of claim 1, wherein
  the monitoring block is to issue a check request to the validation program, and to calculate the first security value responsive to a reply from the validation program;
  the validation program is to measure a time between sending the reply to the monitoring block and receiving the first security value, and to indicate a suspicious event in case the time measured exceeds a predefined threshold, the predefined threshold being set dependent on a type of calculation used to calculate the first security value.

9. The apparatus of claim 1, wherein
  the security-related action includes logging the mismatch event, halting execution of the program code or repairing the part of the program code using the reference copy.

10. The apparatus of claim 1, wherein
  the validation program is to access a memory associated with the first processing resource, and
  the validation program is to change the program code to modify the monitoring block, or to replace the monitoring block by a new monitoring block, or to add to the program code a new monitoring block.

11. The apparatus of claim 1, wherein
  the first processing resource includes a first operating system;
  the second processing resource includes a second operating system; and a processor is to run a virtual machine monitor, wherein the virtual machine monitor is to run the first operating system and the second operating system on the processor.

12. A system, comprising:
an apparatus comprising:
a first processing resource to execute a program code, the program code including a monitoring block, the monitoring block, during execution of the program code, to:
issue a check request to a validation program,
on receipt of an ignore check signal provided by the validation program as a response to the check request, decline to calculate a first security value for a part of the program code, and
otherwise, calculate the first security value; and
a second processing resource separate from the first processing resource, the second processing resource to run the validation program, the validation program to:
send an ignore check signal to the monitoring block in response to the check request, or
receive the first security value, check the first security value against a second security value calculated from a corresponding part of a reference copy of the program code to obtain a check result, and return the check result to the monitoring block,
wherein the monitoring block is to perform a security-related action in response to a check result indicating a mismatch between the first security value and the second security value, and
wherein an amount of ignore check signals sent to the monitoring block is determined dependent on a threat environment; and
a server connected to the second processing resource of the apparatus via a secure channel, the server to receive from the second processing resource information about the check result or a log of a plurality of check results for performing an analysis.

13. The system of claim 12, wherein
the server is to send a message to the validation program in response to the received resource information about the check result or in response to the analysis of the log of the plurality of check results.

14. A method, comprising:
executing, by a first processing resource, a program code, the program code including a monitoring block;
running, by a second processing resource separate from the first processing resource, a validation program;
during execution of the program code,
issuing, by the monitoring block, a check request to the validation program;
on receipt of an ignore check signal provided by the validation program as a response to the check request, refraining, by the monitoring block, from calculating a first security value for a part of the program code,
otherwise, calculating, by the monitoring block, the first security value;
sending, by the validation program, an ignore check signal to the monitoring block in response to the check request, or
receiving, by the validation program, the first security value;
checking, by the validation program, the first security value against a second security value calculated from a corresponding part of a reference copy of the program code to obtain a check result;
returning, by the validation program, the check result to the monitoring block; and
performing, by the monitoring block, a security-related action in response to a check result indicating a mismatch between the first security value and the second security value;
wherein an amount of ignore check signals sent to the monitoring block is determined dependent on a threat environment.

* * * * *